(No Model.)
W. H. TAMBLING.
CHURN.
No. 312,671. Patented Feb. 24, 1885.
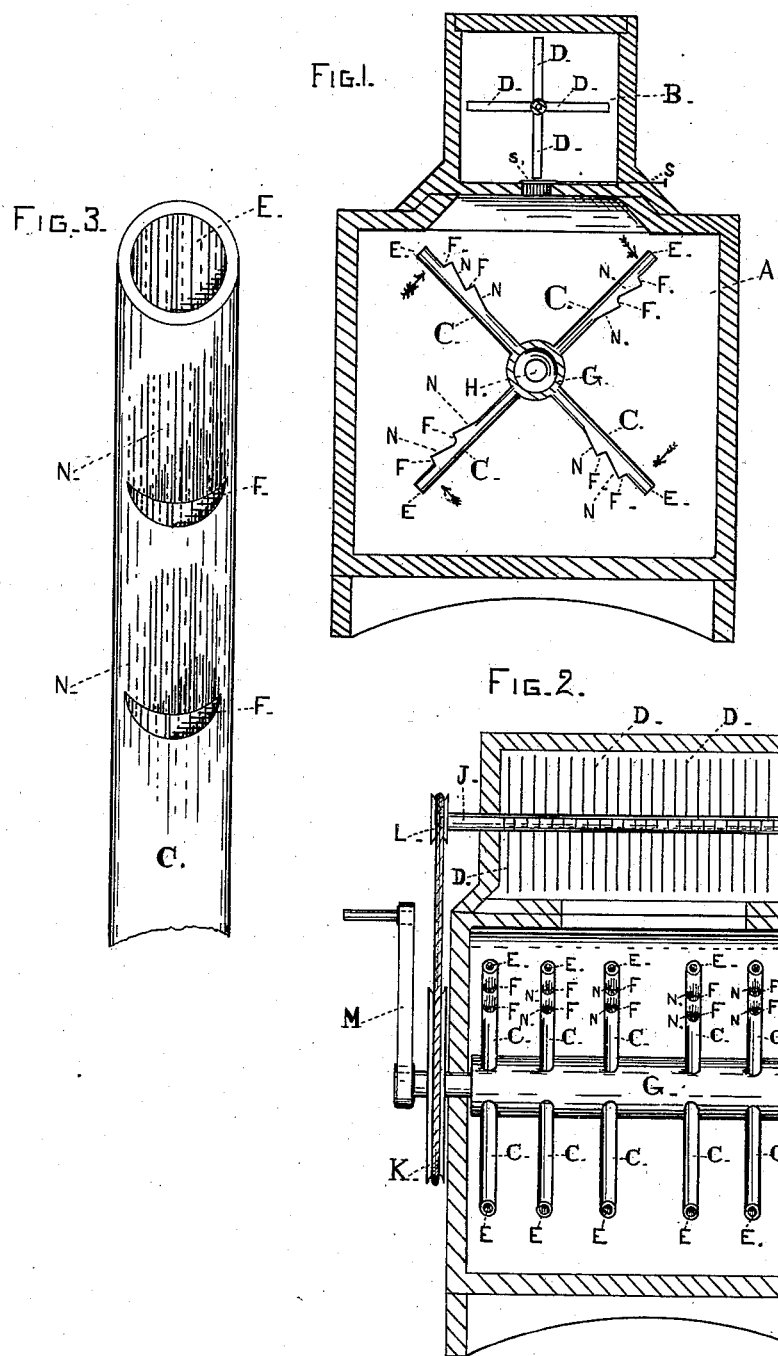
ATTEST,
John H. Redstone
L. B. Redstone
INVENTOR,
William H Tambling

UNITED STATES PATENT OFFICE.

WILLIAM H. TAMBLING, OF SAN FRANCISCO, CALIFORNIA.

CHURN.

SPECIFICATION forming part of Letters Patent No. 312,671, dated February 24, 1885.

Application filed February 23, 1884. (No model.)

*To all whom it may concern:*

Be it known that I, WILLIAM H. TAMBLING, a citizen of the United States, residing in the city and county of San Francisco, and State of California, have invented a new and useful Churn, of which the following is a specification.

My invention relates to that class of churns in which hollow arms are attached to a horizontal hollow shaft.

The nature of my invention will be more readily understood by reference to the accompanying drawings and the letters marked thereon.

Figure 1 is an end or transverse sectional elevation, and Fig. 2 a longitudinal sectional elevation, of my improved churn. Fig. 3 is an elevation of an arm broken off for the purpose of showing an enlarged view.

A represents the body of the churn; B, the cream-cutting chamber; C, the main beaters or arms; D, the cream-cutters; E, the discharge-openings for the arms C, and F shows the receiving-openings; G, the hollow main shaft; H, the hollow journal; J, the journal to which the cream-cutters are attached; K, the main pulley, which is attached to the solid journal of the shaft G for the purpose of giving motion to the pulley L, which is attached to and revolves the cream-cutter shaft.

H represents the hollow journal of the hollow shaft G, which connects with the air-supply chamber O, and through which the air is received to supply the arms or beaters.

N represents the convex portions or scoops upon the front side of the arms. It will be seen that as the scoops N are raised from the openings F, and that as they incline downwardly toward the same, the cream will be caught by said scoops when the dasher is revolved and forced through said openings F into the pipes C, the effect of which is to mix the air with the cream, which greatly facilitates the gathering of the butter.

S shows the slide to open the passage connecting the upper and lower chambers, B and A.

The following is the operation of my improved churn: The cream being poured into the upper chamber, B, the handle or crank M is revolved, giving a rapid motion to the knives or cutters D and thoroughly cutting up the cream. This is generally kept up for about one minute, when the slide S is withdrawn and the cream discharged into the lower chamber or churn, A. This is again repeated, should there be more required for a single churning, which, for the best effect, should fill the chamber A just above the top of the hollow shaft G. The crank M is rapidly revolved, and the centrifugal action throws the cream forcibly out of the arms C, while the convex portions or scoops N catch and throw a constant supply of cream in through the openings F, and the suction keeps a steady stream of air from the shaft, and a consequent mixture of air and cream in the hollow arms or beaters C, and the butter is ready to gather in the space of three minutes or less, according to the condition of the cream.

Having thus described my invention, what I claim, and desire to secure by Letters Patent, is—

1. In a churn, the combination, with the body A, having the cream-cutting chamber B arranged upon the upper side thereof and communicating therewith, and a slide, S, of the hollow main shaft G, having hollow journals H, a pulley mounted on one of said journals, a shaft, J, journaled in box B, a series of cutters, D, arranged upon said shaft, the tubular dashers or beaters C, having inlet-openings F and scoops N, and an air-chamber, O, substantially as set forth.

2. In a churn, the combination, with a hollow shaft having hollow bearings, and with an air-supply chamber, O, arranged upon the outer side of the churn-body, of the tubular dashers or beaters having inlets F and scoops N, as set forth.

WILLIAM H. TAMBLING.

Witnesses:
 JOHN H. REDSTONE,
 L. E. REDSTONE.